(12) United States Patent
Yamashita et al.

(10) Patent No.: US 10,451,424 B2
(45) Date of Patent: Oct. 22, 2019

(54) POSITION AND AZIMUTH DETECTING DEVICE

(71) Applicant: ASAHI KASEI KABUSHIKI KAISHA, Tokyo (JP)

(72) Inventors: Masaya Yamashita, Tokyo (JP); Shiro Kobayashi, Tokyo (JP); Keisuke Shigeta, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 15/614,623

(22) Filed: Jun. 6, 2017

(65) Prior Publication Data

US 2017/0268885 A1 Sep. 21, 2017

Related U.S. Application Data

(63) Continuation of application No. PCT/JP2015/084422, filed on Dec. 8, 2015.

(30) Foreign Application Priority Data

Dec. 9, 2014 (JP) ................................. 2014-249138

(51) Int. Cl.
*G01C 21/26* (2006.01)
*G01C 21/20* (2006.01)
*G01S 5/00* (2006.01)

(52) U.S. Cl.
CPC ............. *G01C 21/26* (2013.01); *G01C 21/20* (2013.01); *G01S 5/00* (2013.01)

(58) Field of Classification Search
None
See application file for complete search history.

(56) References Cited

U.S. PATENT DOCUMENTS 8,767,096 B2 * 7/2014 Horii ................. H04N 5/23293
348/208.4
9,507,414 B2 * 11/2016 Noda ...................... G06F 3/011
(Continued)

FOREIGN PATENT DOCUMENTS

JP 2007-249735 A 9/2007
JP 2008-309530 A 12/2008
(Continued)

OTHER PUBLICATIONS

International Preliminary Report on Patentability for International Application No. PCT/JP2015/084422, issued by the International Bureau of WIPO dated Jun. 13, 2017.
(Continued)

*Primary Examiner* — Shelley Chen

(57) ABSTRACT

Provided is a position and azimuth detecting device including a photographing instructing unit that acquires an output signal of a sensor mounted on equipment and instructs a photographing apparatus mounted on the equipment to perform photographing based on the output signal, a mark reading unit that reads from a mark included in an image photographed based on the instruction from the photographing instructing unit position information and azimuth information included in the mark, a relative position and azimuth calculating unit that calculates a relative position and a relative azimuth of the equipment to the mark based on a geometric shape of the mark included in the image, and a position and azimuth calculating unit that calculates an absolute position and an absolute azimuth of the equipment based on the position information, the azimuth information, the relative position and the relative azimuth.

16 Claims, 16 Drawing Sheets

(56) References Cited

U.S. PATENT DOCUMENTS

| | | | | |
|---|---|---|---|---|
| 2004/0183751 | A1* | 9/2004 | Dempski | G02B 27/017 |
| | | | | 345/8 |
| 2007/0196016 | A1* | 8/2007 | Chen | G06T 7/80 |
| | | | | 382/190 |
| 2011/0039659 | A1* | 2/2011 | Kim | A63B 24/0006 |
| | | | | 482/8 |
| 2012/0047466 | A1* | 2/2012 | Noda | G06F 3/011 |
| | | | | 715/848 |
| 2013/0021323 | A1* | 1/2013 | Chang | G06F 3/0325 |
| | | | | 345/419 |
| 2013/0083221 | A1* | 4/2013 | Horii | H04N 5/23293 |
| | | | | 348/239 |
| 2014/0300636 | A1* | 10/2014 | Miyazaya | H04R 5/033 |
| | | | | 345/633 |
| 2014/0362188 | A1* | 12/2014 | Yokokawa | A63F 13/42 |
| | | | | 348/47 |
| 2015/0062163 | A1* | 3/2015 | Lee | G09G 3/003 |
| | | | | 345/633 |
| 2015/0094142 | A1* | 4/2015 | Stafford | G06F 3/04815 |
| | | | | 463/31 |
| 2017/0322672 | A1* | 11/2017 | Kitani | G06F 3/0386 |

FOREIGN PATENT DOCUMENTS

| | | | |
|---|---|---|---|
| JP | 2009-070357 | A | 4/2009 |
| JP | 2011-048415 | A | 3/2011 |

OTHER PUBLICATIONS

International Search Report for International Patent Application No. PCT/JP2015/084422, issued by the Japan Patent Office dated Mar. 8, 2016.

* cited by examiner

POSITION AND AZIMUTH DETECTING DEVICE

The contents of the following Japanese patent application(s) are incorporated herein by reference:
NO. 2014-249138 filed in JP on Dec. 9, 2014, and
NO. PCT/JP2015/084422 filed on Dec. 8, 2015

BACKGROUND

1. Technical Field

The present invention relates to a position and azimuth detecting device and a position and azimuth detecting program.

2. Related Art

Conventionally, a position and azimuth detecting device which detects a position and an azimuth by photographing a mark is known. The position and azimuth detecting device detects the position and the azimuth of a user based on the position information and the azimuth information read from the mark and a relative position and a relative azimuth to the mark (for example, see Patent Document 1).

Patent Document 1: Japanese Patent Application Publication No. 2008-309530

However, for the conventional position and azimuth detecting device, a photographing apparatus has to be operated continuously or periodically for a user to detect the position and the azimuth unconsciously. For this reason, there is a problem that power consumption of the conventional position and azimuth detecting device is large.

SUMMARY

According to a first aspect of the present invention, provided is a position and azimuth detecting device including a photographing instructing unit that acquires an output signal of a sensor mounted on equipment and instructs a photographing apparatus mounted on the equipment to perform photographing based on the output signal, a mark reading unit that reads from a mark included in an image photographed based on the instruction from the photographing instructing unit position information and azimuth information included in the mark, a relative position and azimuth calculating unit that calculates a relative position and a relative azimuth of the equipment to the mark based on a geometric shape of the mark included in the image, and a position and azimuth calculating unit that calculates an absolute position and an absolute azimuth of the equipment based on the position information, the azimuth information, the relative position and the relative azimuth, wherein the photographing instructing unit instructs the photographing apparatus to perform photographing when the output signal of the sensor has a shape associated with a position of the mark.

According to a second aspect of the present invention, provided is a position and azimuth detecting program which makes a computer function as the photographing instructing unit, the mark reading unit, the relative position and azimuth calculating unit, and the position and azimuth calculating unit in the position and azimuth detecting device set forth in the first aspect.

According to a third aspect of the present invention, provided is a position and azimuth detecting system including a sensor that is mounted on equipment and acquires a signal associated with a position of a mark, a photographing instructing unit that acquires an output signal of the sensor and issues a photographing instruction based on the output signal, a photographing apparatus that is mounted on the equipment and photographs an image based on the instruction from the photographing instructing unit, a mark reading unit that reads from a mark included in the photographed image position information and azimuth information included in the mark, a relative position and azimuth calculating unit that calculates a relative position and a relative azimuth of the equipment to the mark based on a geometric shape of the mark included in the image, and a position and azimuth calculating unit that calculates an absolute position and an absolute azimuth of the equipment based on the position information, the azimuth information, the relative position and the relative azimuth, wherein the photographing instructing unit instructs the photographing apparatus to perform photographing when the output signal of the sensor has a shape associated with the position of the mark.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention is described through the embodiments of the invention. However, the following embodiments do not limit the invention according to the scope of the claims. Also, all the combinations of the features described in the embodiments are not necessarily essential to the means for solving the problem of the invention.

Figure 1:
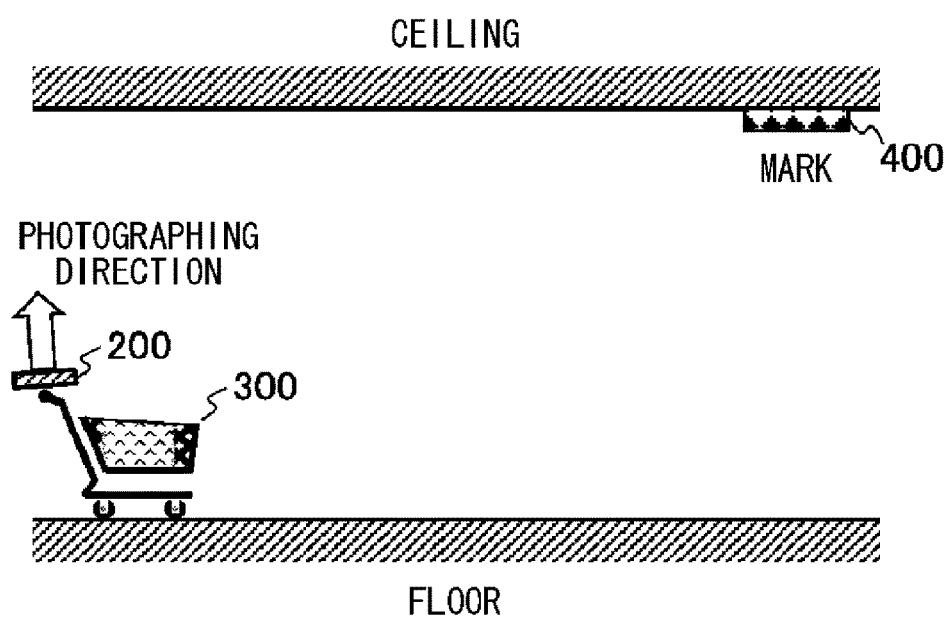
FIG. 1 shows an example of a configuration of a position and azimuth detecting device 100.

FIG. 1 shows an exemplary usage of a position and azimuth detecting system 200. The position and azimuth detecting system 200 of the present example is mounted on a shopping cart 300.

The position and azimuth detecting system 200 photographs a mark 400 placed on the ceiling of a commercial facility. The mark 400 includes a geometric shape in which position information and azimuth information are recorded. For example the mark 400 is a QR code (registered trademark). The position and azimuth detecting system 200 detects an absolute position and an absolute azimuth based on a photographed image. The absolute position represents a location where a user is located such as latitude and longitude. Furthermore, the absolute azimuth is an azimuth to which the user faces. The absolute azimuth is the azimuth angle of the direction of the user with the north as a reference.

Note that it is presupposed that the position and the azimuth of the user are equal to the position and the azimuth of the position and azimuth detecting system 200 for a brief description herein. In other words, when simply called the position and azimuth of the user, they may refer to the position and azimuth of the position and azimuth detecting system 200. When the position and azimuth of the user are different from the position and azimuth of the position and azimuth detecting system 200, the position and azimuth may be corrected according to the relationship between the user and the position and azimuth detecting system 200.

Figure 2:
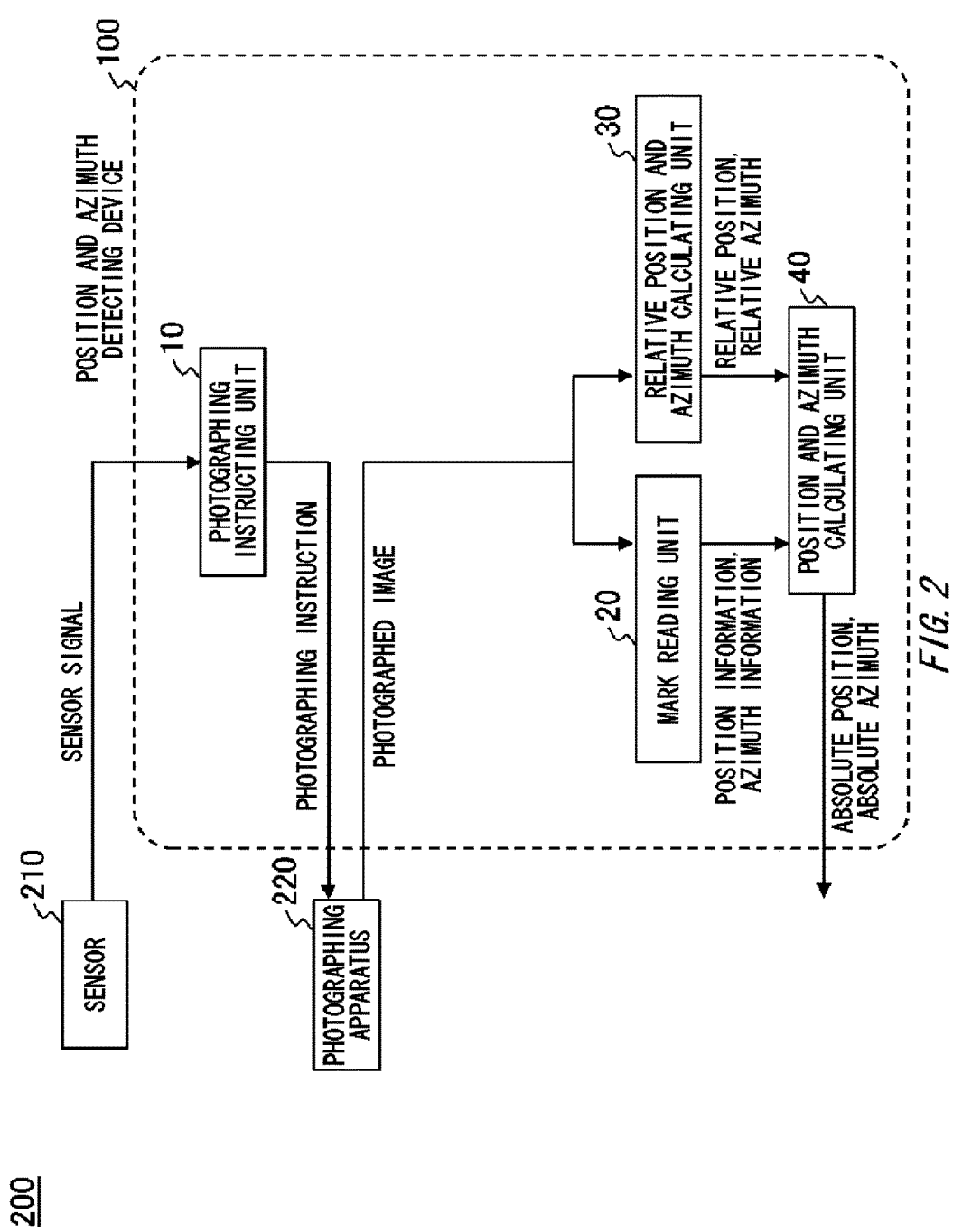
FIG. 2 shows a schematic block diagram illustrating an exemplary configuration of a position and azimuth detecting system 200.

FIG. 2 shows a schematic block diagram illustrating an exemplary configuration of a position and azimuth detecting system 200. The position and azimuth detecting system 200 includes a position and azimuth detecting device 100, a sensor 210 and a photographing apparatus 220.

The sensor 210 acquires a signal associated with a placement location of the mark 400. The signal associated with the placement location of the mark 400 refers to such a signal as for example, a shape of the signal detected within a predetermined distance from the placement location of the mark 400 and a shape of the signal detected outside a predetermined distance from the placement location of the mark 400 are so different that they can be identified. The shape of the signal may be the shape of the time waveform of the signal or the shape of the spectrum of the signal. In addition, the signal may be any type of signal such as an electric signal, an optical signal, a magnetic signal or the like.

Furthermore, the sensor 210 may detect the signal generated by the mark 400, or may detect the signal generated by an object arranged around the mark 400. In addition, in response to the signal from the sensor 210, the mark 400 or a peripheral object generates a signal and the sensor 210 may detect the signal. Furthermore, the sensor 210 may detect a motion the user likely to do in the location where the mark 400 is arranged. For example, sensor 210 is an acceleration sensor, an angular velocity sensor, a magnetic sensor, an illumination sensor, a barometric sensor, a radio wave receiver or a microphone. Which sensor should be used may be selected suitably according to the environment where and the purpose for which the sensor 210 is utilized, or the like.

The photographing apparatus 220 is placed on a shopping cart 300 in a posture with which the ceiling of the commercial facility can be photographed. Therefore, the photographing apparatus 220 can photograph the mark 400 when the user moves under the mark 400. The photographing apparatus 220 of the present example photographs the ceiling according to a photographing instruction from the position and azimuth detecting device 100. Note that the position and the azimuth of the photographing apparatus 220 are considered as identical to the position and the azimuth of the position and azimuth detecting system 200 for a brief description herein.

The position and azimuth detecting device 100 includes a photographing instructing unit 10, a mark reading unit 20, a relative position and azimuth calculating unit 30 and a position and azimuth calculating unit 40. The position and azimuth detecting device 100 outputs an absolute position and an absolute azimuth of the user based on the output signal of the sensor 210. For example, the absolute position and the absolute azimuth are the position and the azimuth of the user on the map of the commercial facility.

The photographing instructing unit 10 determines whether the user is located at the placement location of the mark 400 based on the output signal from the sensor 210. For example, the determination whether the user is located at the placement location of the mark 400 is based on a shape of the output signal. The determination based on the shape of the output signal includes the determination based on strength of the output signal of the sensor 210. Furthermore, the determination based on the shape of the output signal includes the determination in the case where a variation pattern of the output signal of the sensor 210 is a predetermined pattern. The variation pattern is for example, a pattern in which the value of the output signal of the sensor 210 is larger than a predetermined threshold, a pattern in which the value of the output signal of the sensor 210 is smaller than the predetermined threshold or a time variation pattern of the output signal of the sensor 210. Upon determining that the user is located at the placement location of the mark 400, the photographing instructing unit 10 outputs the photographing instruction to the photographing apparatus 220.

The mark reading unit 20 reads position information and azimuth information recorded in the mark 400 in the photographed image the photographing apparatus 220 photographed. When the mark 400 in the photographed image has an inclination with respect to the photographing apparatus 220, the mark reading unit 20 may correct the inclination of the position and azimuth calculating unit 40 so that the mark 400 faces right in front of the photographing apparatus 220. The mark reading unit 20 outputs the read position information and azimuth information to the position and azimuth calculating unit 40.

The relative position and azimuth calculating unit 30 calculates a relative position and a relative azimuth to the mark 400 based on the mark 400 in the photographed image photographed by the photographing apparatus 220. The relative position refers to a position of the user with the mark 400 as a reference. Furthermore, the relative azimuth refers to an azimuth to which the user faces relative to a reference azimuth of the mark 400. The relative position and azimuth calculating unit 30 outputs the calculated relative position and relative azimuth to the position and azimuth calculating unit 40.

The position and azimuth calculating unit 40 calculates an absolute position and an absolute azimuth of the user based on the input position information, azimuth information, relative position and relative azimuth. When the user is located at the position of the mark 400, the absolute position of the user is equal to the position information. Furthermore, when the user faces the reference azimuth of the mark 400, the absolute azimuth of the user is equal to the azimuth information. Meanwhile, when the user is not located at the position of the mark 400, the absolute position of the user is a position corrected using the relative position. In addition, when the user does not face the reference azimuth of the mark 400, the absolute azimuth of the user is an azimuth corrected using the relative azimuth.

The position and azimuth detecting device 100 of the present example operates the photographing apparatus 220 only when it determines that the user is located at the placement location of the mark 400. In other words, the position and azimuth detecting system 200 does not operate the photographing apparatus 220 when the user is not located at the placement location of the mark 400, therefore the power consumption can be reduced.

Figure 3:
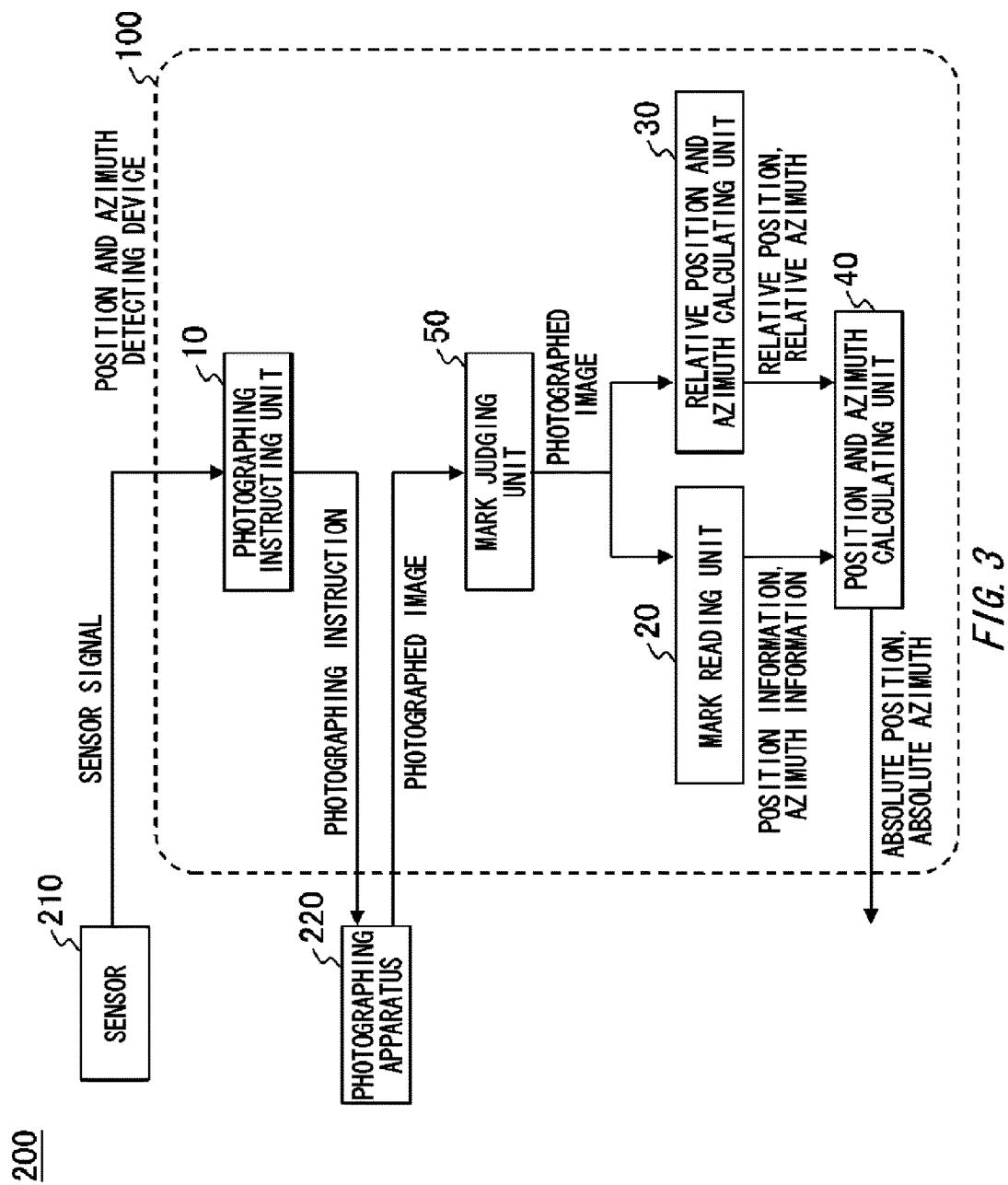
FIG. 3 shows a schematic block diagram illustrating an exemplary configuration of the position and azimuth detecting system 200.

FIG. 3 shows a schematic block diagram illustrating an exemplary configuration of a position and azimuth detecting system 200. The position and azimuth detecting device 100 of the present example further include a mark judging unit 50.

The mark judging unit 50 judges whether the mark 400 is present in the photographed image based on the photographed image input from the photographing apparatus 220. The mark judging unit 50 discards the photographed image when the mark 400 is not present in the photographed image. Meanwhile, the mark judging unit 50 outputs the photographed image to the mark reading unit 20 and the relative position and azimuth calculating unit 30 when mark 400 is present in the photographed image. Whether the mark 400 is present or not depends on whether information described in the mark 400 can be acquired from the photographed image or not. In other words, even when the mark 400 is included in the photographed image, if the information the mark 400 includes cannot be acquired, it is judged that the mark 400 is not present. The position and azimuth detecting device 100 of the present example operates the mark reading unit 20 and the relative position and azimuth calculating unit 30 only when the mark judging unit 50 judges that the mark 400 is present in the photographed image, therefore the power consumption can be further reduced.

In each embodiment described below (embodiments 1 to 4), the output signal of the sensor 210 is associated with the placement location of the mark 400. In the embodiments 1 to 4, a method for determining whether the user is located at the placement location of the mark 400 based on the output signal of the sensor 210 is described.

Embodiment 1

Figure 4:
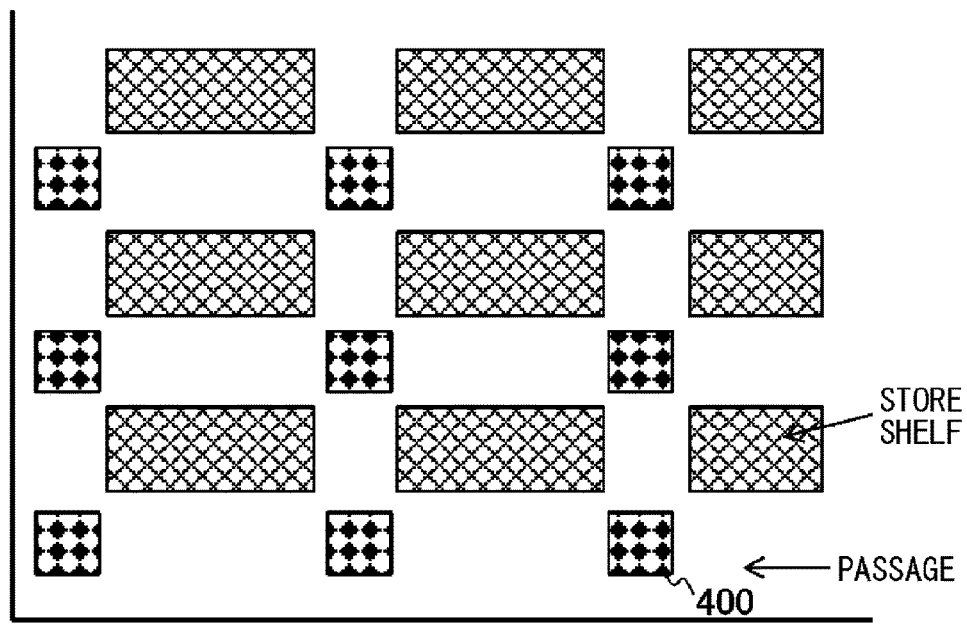
FIG. 4 shows a plan view of a commercial facility illustrating a placement location of a mark 400 placed on the ceiling.

FIG. 4 shows a plan view of a commercial facility illustrating a placement location of a mark 400 placed on the ceiling. In the present example, the mark 400 is placed at intersections of passages at which a turn motion of the user is expected. The position and azimuth detecting system 200 of the present example determines whether the user is located at the placement location of the mark 400 from the output signal of the angular velocity sensor placed on the shopping cart 300. Note that the placement location of the mark 400 may be a corner, a curving road and the like of the passages as long as it is a location where the turn motion of the user can be detected.

Figure 5:
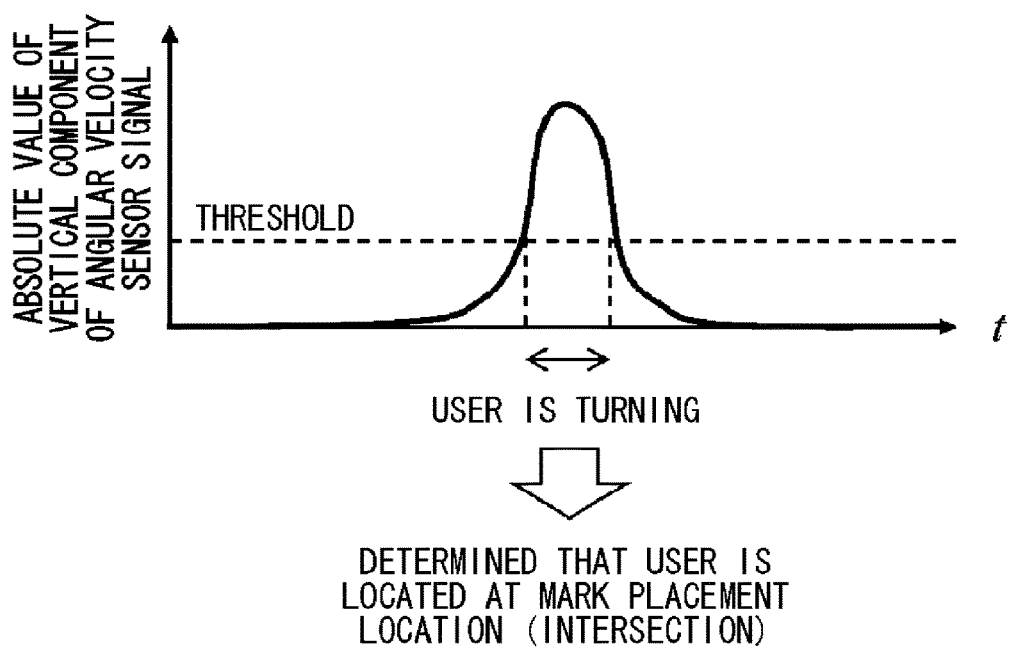
FIG. 5 shows a schematic illustration of a time variation of an angular velocity sensor signal.

FIG. 5 shows a schematic illustration of a time variation of an angular velocity sensor signal. The vertical axis represents an absolute value of a vertical component of the angular velocity sensor signal, and the horizontal axis represents time t. The angular velocity sensor signal refers to the output signal from the sensor 210 in the case where the sensor 210 is an angular velocity sensor. Note that the vertical component of the angular velocity sensor signal is a component generated when the user turns at an intersection.

The photographing instructing unit 10 compares the absolute value of the vertical component of the signal input from the angular velocity sensor with a predetermined threshold. The photographing instructing unit 10 determines that the user is turning when the absolute value of the vertical component of the angular velocity sensor signal exceeds the threshold. In this case, the photographing instructing unit 10 determines that the user is located at the intersection where the mark 400 is placed. Furthermore, the photographing instructing unit 10 may determine that the user is located at an intersection when time period for which the photographing instructing unit 10 determines that the user is turning is a predetermined time or longer.

In addition, the photographing instructing unit 10 may determine whether the user is turning based on an absolute value of time integral value obtained by integrating the vertical component of the angular velocity sensor signal over the predetermined time. In this case, when the absolute value of the time integral value is larger than the predetermined threshold, the photographing instructing unit 10 determines that the user is turning and is located at an intersection. Any type of sensor may be used as the sensor 210 as long as it can determine that the user is located at an intersection. For example, the position and azimuth detecting system 200 can use an acceleration sensor as the sensor 210.

Embodiment 2

Figure 6:
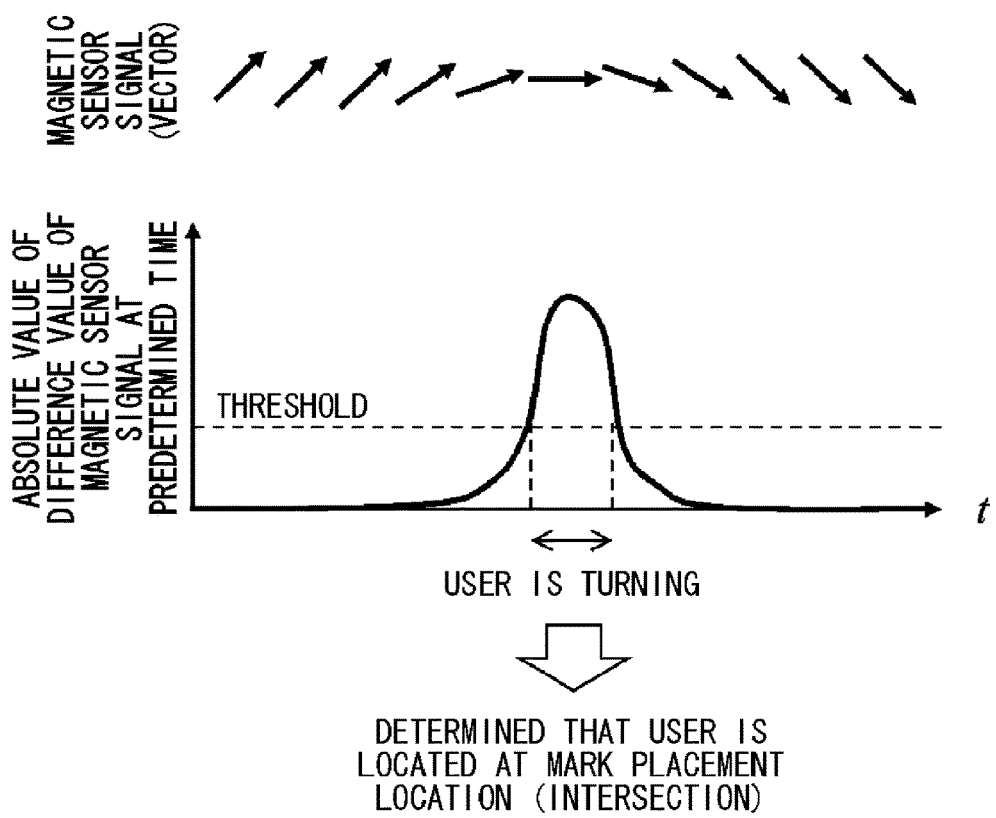
FIG. 6 shows a schematic illustration of a time variation of a magnetic sensor signal.

FIG. 6 shows a schematic illustration of a time variation of a magnetic sensor signal. The magnetic sensor signal refers to an output signal of the sensor 210 in the case where the sensor 210 is a magnetic sensor. The sensor 210 of the present example is a magnetic sensor that is placed on the shopping cart 300 and detects an external magnetic field. For the present embodiment, the mark 400 is placed on the ceiling above an intersection of a commercial facility, as in the case with embodiment 1. The vertical axis represents an absolute value of a difference value of the magnetic sensor signal at a predetermined time, and the horizontal axis represents time t. For example, the difference value of the magnetic sensor signal is a difference between a magnetic sensor signal in a stable state and a magnetic sensor signal at the time of measurement.

The photographing instructing unit 10 compares the absolute value of the difference value of the magnetic sensor signal at a predetermined time with a predetermined threshold. The photographing instructing unit 10 determines that the user is turning when the absolute value of the difference value of the magnetic sensor signal exceeds the threshold. In this case, the photographing instructing unit 10 determines that the user is located at the intersection where the mark 400 is placed. Furthermore, the photographing instructing unit 10 may determine that the user is located at an intersection when the time period for which the photographing instructing unit 10 determines that the user is turning is a predetermined time or longer.

Embodiment 3

Figure 7:
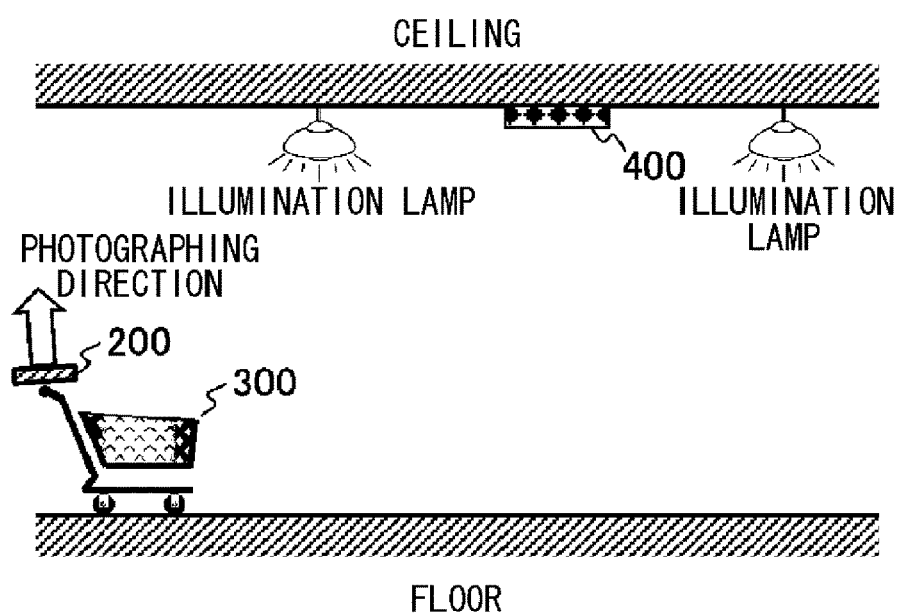
FIG. 7 shows an exemplary placement of the mark 400 for the case where an illumination sensor is used.

FIG. 7 shows an exemplary placement of the mark 400 for the case where an illumination sensor is used. FIG. 7 is a diagram of a commercial facility as viewed from the horizontal direction. In the passage where multiple illumination lamps are placed along a direction of travel, the mark 400 is placed at the midpoint of two adjacent illumination lamps. The sensor 210 of the present example is an illumination sensor which is placed on the shopping cart 300 and senses illumination from the ceiling. The position and azimuth detecting system 200 determines whether the user is located at the placement location of the mark 400 based on the signal sensed by the illumination sensor.

Figure 8:
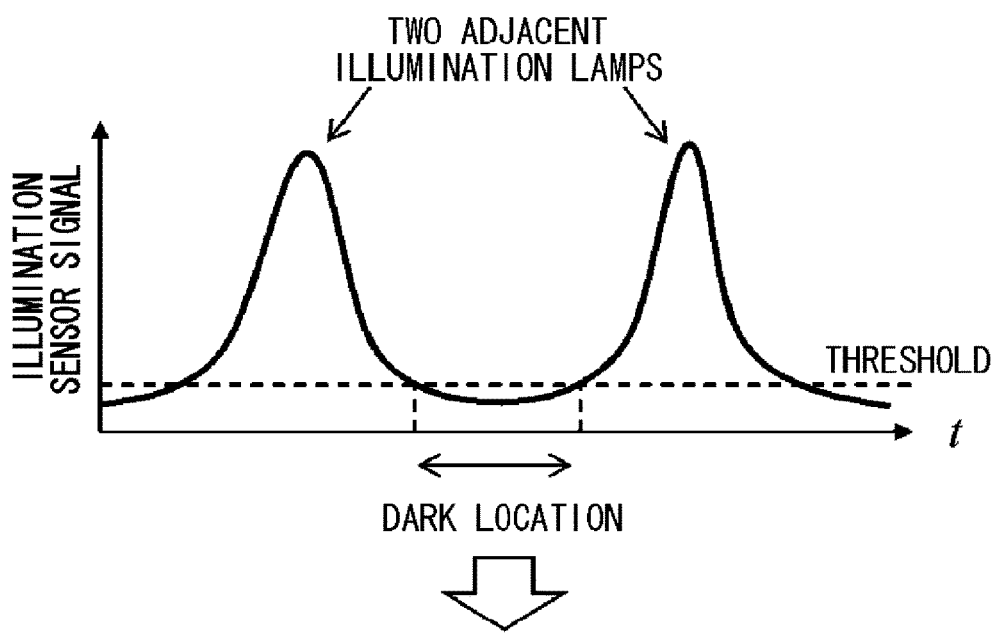
FIG. 8 shows a schematic illustration of a time variation of an illumination sensor signal.

FIG. 8 shows a schematic illustration of a time variation of an illumination sensor signal. The illumination sensor signal refers to an output signal from the sensor 210 in the case where the sensor 210 is an illumination sensor. The vertical axis represents an illumination sensor signal and the horizontal axis represents time t.

The photographing instructing unit 10 compares the illumination sensor signal with a predetermined threshold. When the illumination sensor signal has a value smaller than the threshold, the photographing instructing unit 10 determines that the user is located at the midpoint of the two adjacent illumination lamps. In this case, because the mark 400 is placed at the midpoint of the two illumination lamps, the photographing instructing unit 10 determines that the user is located under the mark 400. Alternatively, the photographing instructing unit 10 may determine that the user is located under the mark 400 when the illumination sensor signal reaches the local maximum value and then the illumination sensor signal reaches a value smaller than a predetermined threshold.

Alternatively, the mark 400 may be placed near an illumination lamp. In this case, when the illumination sensor signal has a value larger than the threshold, the photographing instructing unit 10 determines that the user is located under the mark 400 near the illumination lamp.

Embodiment 4

An embodiment in which the mark 400 is placed near an illumination lamp repeating a predetermined blinking pattern, and whether the user is located at the placement location of the mark 400 is determined from the output signal of the illumination sensor placed on the shopping cart 300 is described.

Figure 9:
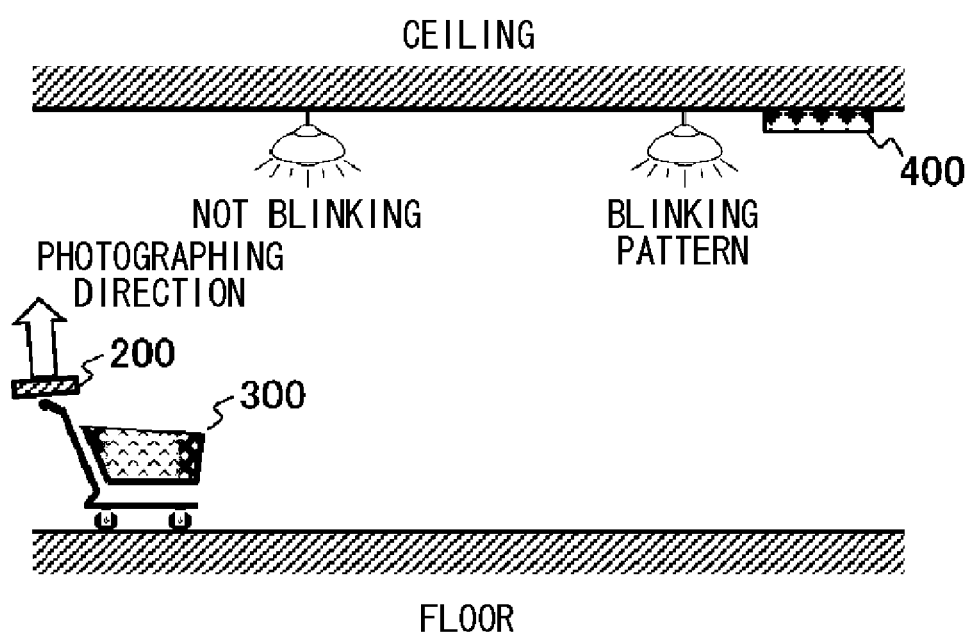
FIG. 9 shows an exemplary placement of the mark 400 for the case where the illumination sensor is used.

FIG. 9 shows an exemplary placement of the mark 400 for the case where the illumination sensor is used. FIG. 9 is a diagram of a commercial facility as viewed from the horizontal direction. The mark 400 of the present example is placed near the illumination lamp repeating a collation digital signal pattern. The collation digital signal pattern refers to a digital signal pattern which can be collated with a predetermined illumination sensor signal. The sensor 210 of the present example is an illumination sensor which is placed on the shopping cart 300 and senses illumination from the ceiling. The position and azimuth detecting system 200 determines whether the user is located at the placement location of the mark 400 based on a signal sensed by the illumination sensor.

Figure 10:
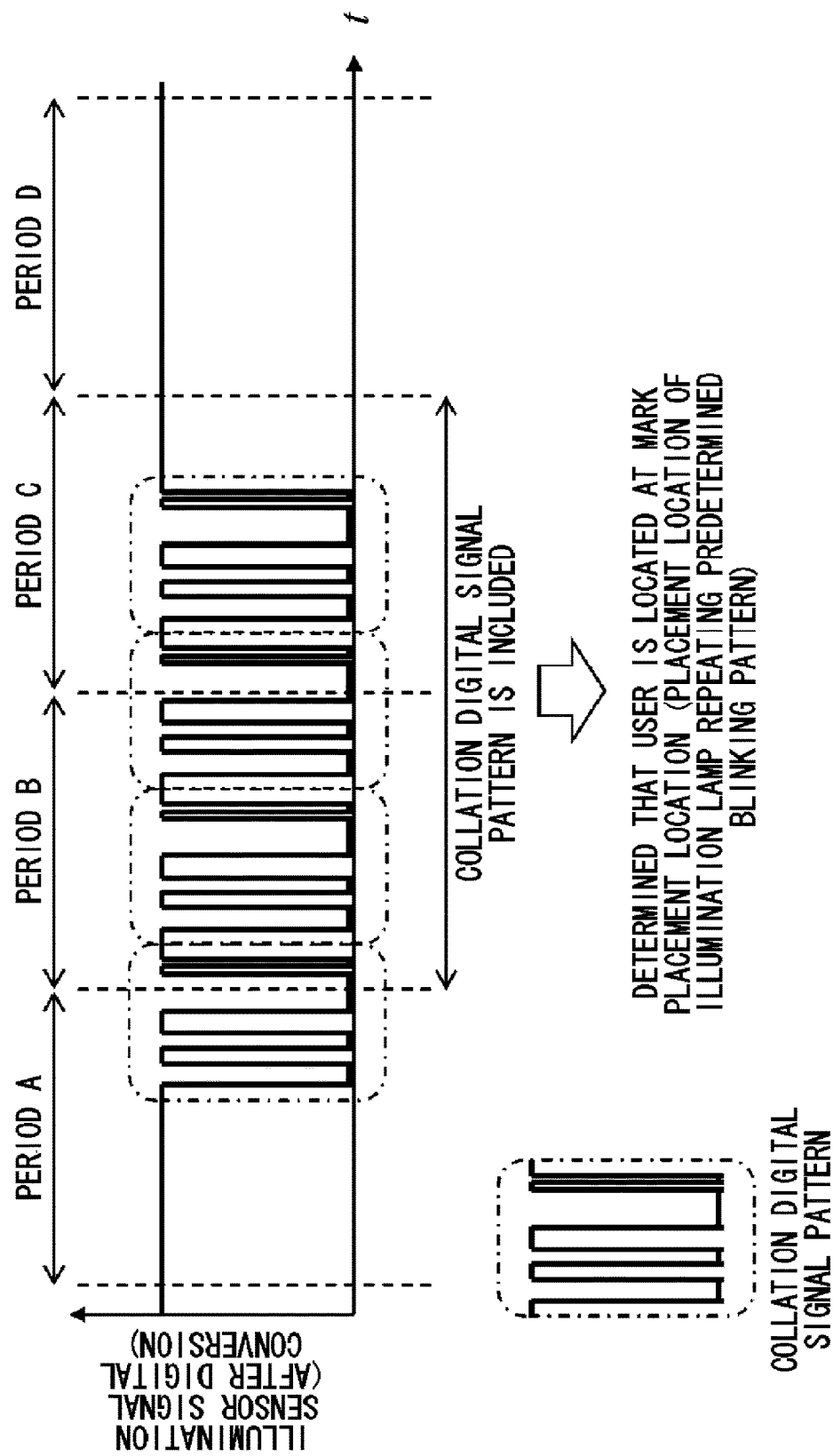
FIG. 10 shows a schematic illustration of a time variation of an illumination sensor signal.

FIG. 10 shows a schematic illustration of a time variation of an illumination sensor signal. The vertical axis represents an illumination sensor signal after digital conversion, and the horizontal axis represents time t.

The photographing instructing unit 10 digitally converts an input illumination sensor signal. Furthermore, the photographing instructing unit 10 judges whether the collation digital signal pattern corresponding to the predetermined blinking pattern exists within a predetermined time period. When the digital signal pattern exists within the predetermined time period, the photographing instructing unit 10 determines that the user is located at the placement location of the illumination lamp repeating the predetermined blinking pattern, that is, the placement location of the mark 400.

A part of the collation digital signal pattern is detected in the period A. However, the photographing instructing unit 10 determines that the user is not located at the placement location of the mark 400 because the entire collation digital signal pattern is not detected in the period A.

Meanwhile, the entire collation digital signal pattern is detected in the periods B and C. Thus, the photographing instructing unit 10 determines that the user is located at the placement location of the mark 400.

In the period D, the collation digital signal pattern is not detected, and a constant illumination sensor signal is input. Thus, the photographing instructing unit 10 determines that the user is not located at the placement location of the mark 400.

As described above, the photographing instructing unit 10 determines whether the user is located at the position of the illumination lamp having a predetermined blinking pattern based on the collation digital signal pattern. Thereby, the position and azimuth detecting system 200 can detect that the user is located at the position of the mark 400. Furthermore, the present example has a high degree of freedom in location where the mark 400 is placed in that the mark 400 does not need to be placed at intersections of passages.

Note that in the position and azimuth detecting system 200, as an example, an angular velocity sensor, an acceleration sensor, a magnetic sensor and an illumination sensor placed to be associated with the mark 400 are used. However, the position and azimuth detecting system 200 may sense the position of the user with a barometric sensor by placing the mark 400 at an indoor/outdoor connection location or an air conditioner installation location. Alternatively, the position and azimuth detecting system 200 may sense the position of the user with a radio wave receiver by placing mark 400 in combination with a radio wave transmitter. Furthermore, the position and azimuth detecting system 200 may sense the position of the user with a microphone by placing the mark 400 in combination with a speaker.

In any of embodiments 1 to 4, the mark 400 is placed on the ceiling above the location where the output signal of the sensor 210 is expected to have a predetermined shape. Thereby, by linking the output signal of the sensor 210 with the mark placement location, the position and azimuth detecting device 100 makes the photographing apparatus 220 operate based on the output signal of the sensor 210 only at a location where the mark 400 is expected to be placed, despite intermittent photographing.

In embodiments 1 and 2, the output signal of the sensor 210 is a signal associated with the position of the mark 400 based on motion information of the user. The motion information of the user in embodiments 1 and 2 is an angular velocity sensor signal and a magnetic sensor signal detected when the user turns at an intersection. Furthermore, in embodiments 3 and 4, the output signal of the sensor 210 is a signal associated with the position of the mark 400 independently of the motion information of the user. Embodiments 3 and 4 are not affected by the motion of the user. Note that the position and azimuth detecting system 200 can improve detection accuracy of the position of the user by combining embodiments 1 to 4 respectively.

Comparative Example

Figure 11:
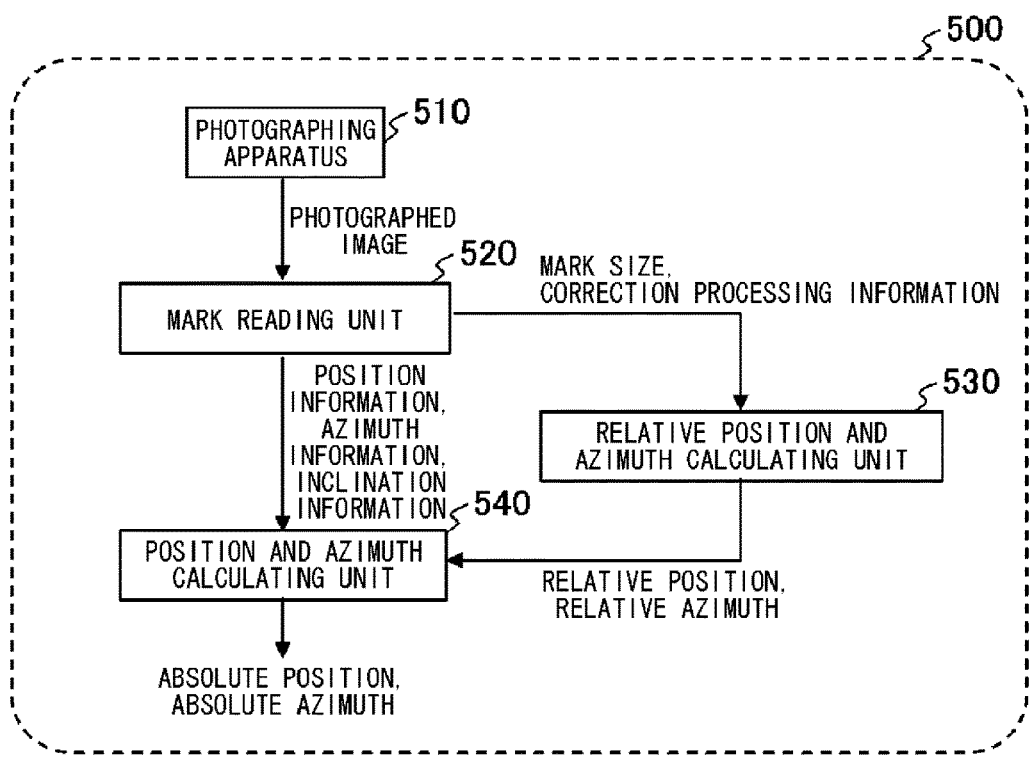
FIG. 11 shows an example of a configuration of a position and azimuth detecting device 500 of a comparative example.

FIG. 11 shows an example of a configuration of a position and azimuth detecting device 500 of a comparative example. The position and azimuth detecting device 500 includes a photographing apparatus 510, a mark reading unit 520, a relative position and azimuth calculating unit 530 and a position and azimuth calculating unit 540.

The photographing apparatus 510 starts photographing regardless of whether or not the mark is included in a photographing range. The photographing apparatus 510 outputs the photographed image to the mark reading unit 520.

The mark reading unit 520 reads the mark from the photographed image. When the mark in the photographed image is inclined, the mark reading unit 520 may correct the mark to a mark as viewed in a squarely facing manner. The mark reading unit 520 retrieves position information, azimuth information and inclination information from the corrected mark, and outputs them to the position and azimuth calculating unit 540. The inclination information is an inclination of the mark between the mark before the correction and the mark after the correction. The inclination information is used for calculating the position of the user relative to the mark. Furthermore, the mark reading unit 520 retrieves a mark size and correction processing information from the mark, and outputs them to the relative position and azimuth calculating unit 530. The correction processing information is information as to the correction processing performed to the photographed image to calculate the mark size. For example, the correction processing information includes rotation information and scale information of the photographed image.

The relative position and azimuth calculating unit 530 calculates a ratio of the mark size before the correction to the mark size after the correction. The relative position and azimuth calculating unit 530 detects a relative position of the user to the mark with reference to a correspondence table between a distance and the size ratio stored in advance. Furthermore, the relative position and azimuth calculating unit 530 detects a relative azimuth of the user from the correction processing information.

The position and azimuth calculating unit 540 detects an absolute position and an absolute azimuth of the position and azimuth detecting device 500 based on the position information and the azimuth information read from the mark, and the relative position and the relative azimuth of the user to the mark.

Figure 12:
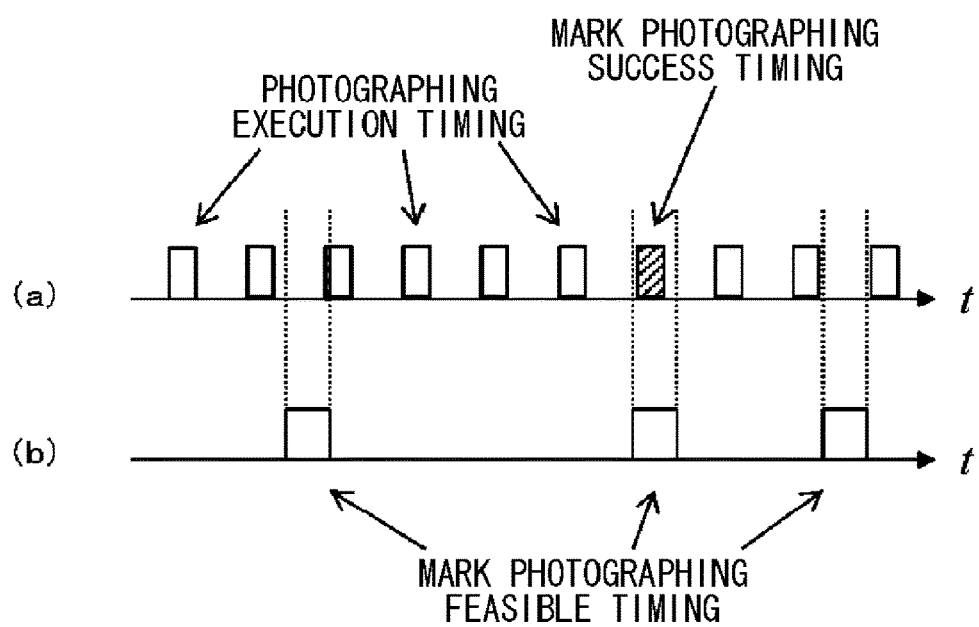
FIG. 12 shows an example of a photographing timing of a position and azimuth detecting device 500.

FIG. 12 shows an example of a photographing timing of a position and azimuth detecting device 500. The portion (a) of FIG. 12 shows a photographing execution timing in the case where the photographing apparatus 510 is made to execute photographing periodically. The portion (b) of FIG. 12 shows a mark photographing feasible timing at which the user moves to the mark placement location and can photograph the mark.

A timing where the photographing execution timing and the mark photographing feasible timing overlap is a mark photographing success timing at which the mark can be photographed. The mark photographing success timing is shown with a shaded part in the portion (a) of FIG. 12. Meanwhile, in the portion (a) of FIG. 12, all squares except the shaded part are timings at which the mark is not photographed although the photographing apparatus 510 executes photographing. In this way, the position and azimuth detecting device 500 executes photographing periodically independently of the mark photographing feasible timing. In this case, whether the mark is photographed and included in the image or not when photographing is executed is based on probability. In other words, power consumption of a system using the position and azimuth detecting device 500 is large because the photographing apparatus is operated at timings besides the mark photographing feasible timing.

(Implementation 1)

Figure 13:
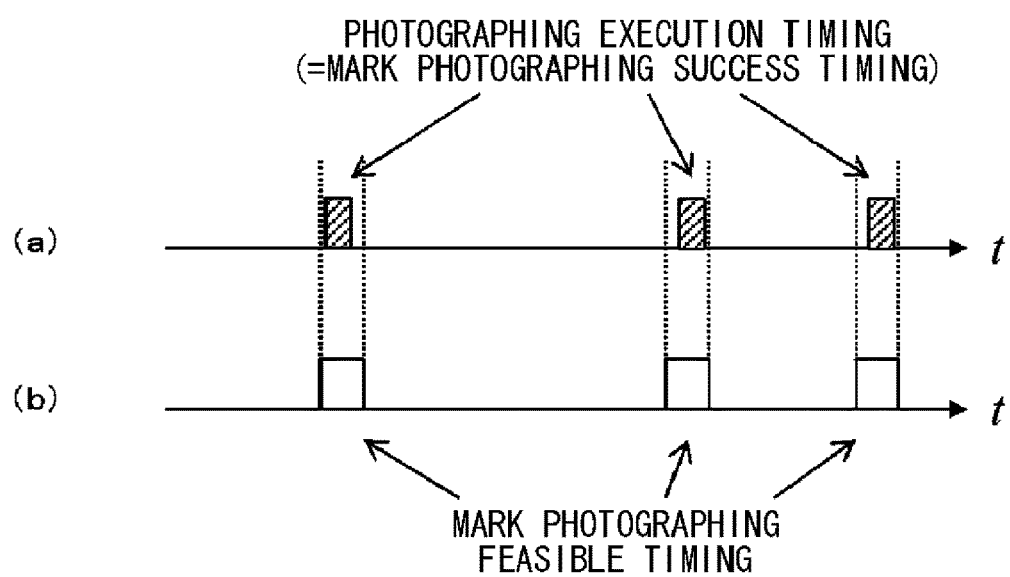
FIG. 13 shows an example of an operation of the position and azimuth detecting system 200.

FIG. 13 shows an example of an operation of the position and azimuth detecting system 200. The portion (a) of FIG. 13 shows the photographing execution timing, and the portion (b) of FIG. 13 shows the mark photographing feasible timing. Note that any of embodiments 1 to 4 may be used in the position and azimuth detecting system 200.

In the position and azimuth detecting system 200, the mark 400 is placed at the location associated with the output signal of the sensor 210, and photographing is executed based on the output signal. Thereby, in the position and azimuth detecting system 200, photographing is executed only at the mark photographing feasible timing. In other words, in the position and azimuth detecting system 200, power consumption can be reduced even if the detection of the position and the azimuth by photographing the mark 400 is automated.

(Implementation 2)

Figure 14:
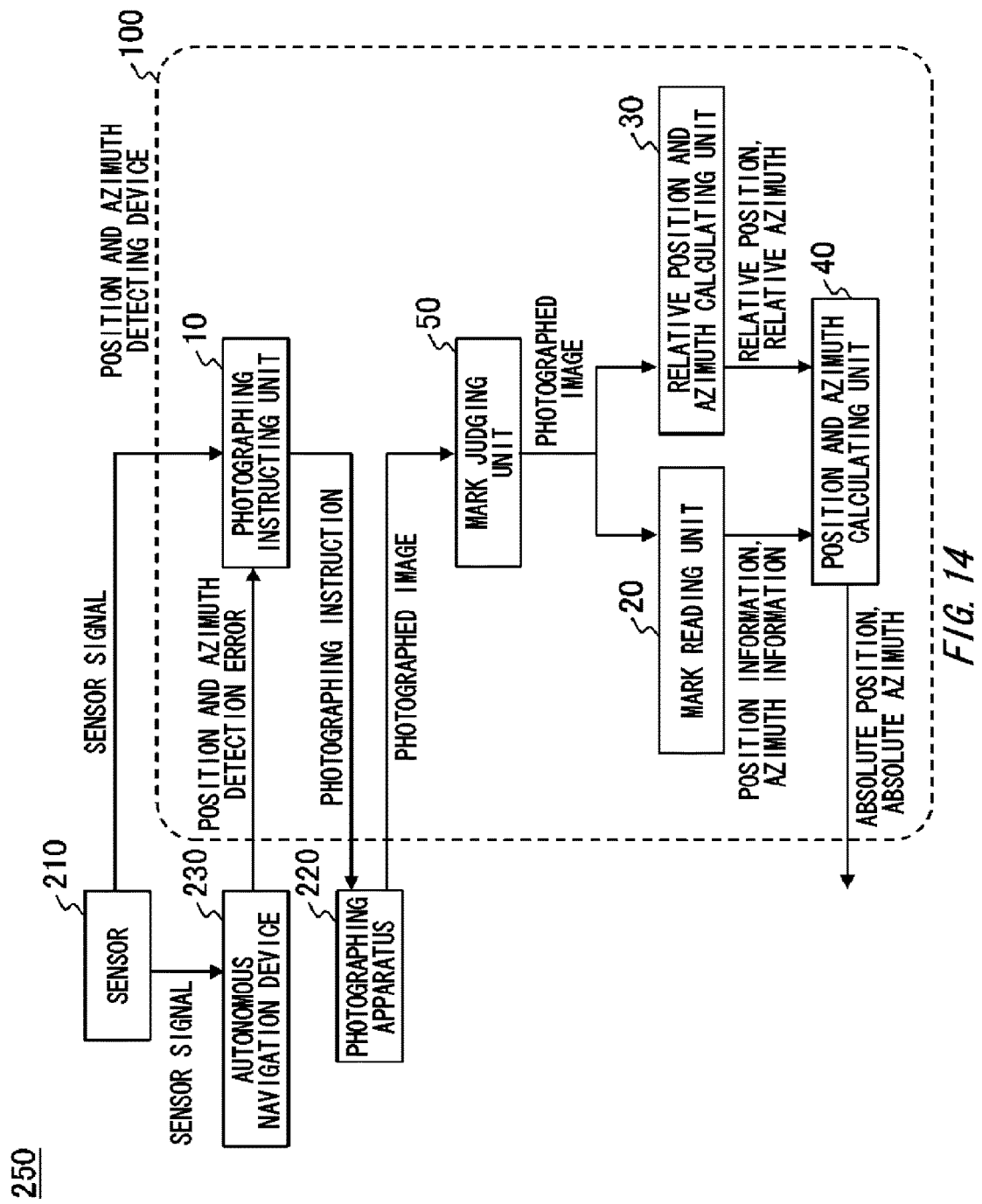
FIG. 14 shows a schematic block diagram illustrating an exemplary configuration of a position and azimuth detecting system 250.

FIG. 14 shows a schematic block diagram illustrating an exemplary configuration of a position and azimuth detecting system 250. The position and azimuth detecting system 250 of the present example further includes a dead-reckoning device 230.

The dead-reckoning device 230 calculates the position and the azimuth of the user based on an output signal from the sensor 210. For example, the position and the azimuth of the user are calculated from an acceleration sensor signal, an angular velocity sensor signal, a magnetic sensor signal and a barometric sensor signal. However, a position and azimuth detection error can occur in the calculated position and azimuth of the user. The position and azimuth detection error is deviation between the position and the azimuth of the user calculated by the dead-reckoning device 230 and a true position and a true azimuth of the user.

Furthermore, the dead-reckoning device 230 estimates the position and azimuth detection error using statistical data prepared in advance. For example, the statistical data is data indicating an average deviation between the position and the azimuth of the user calculated by the dead-reckoning device 230 and a true position and a true azimuth of the user. The average deviation is an average of errors caused according to elapsed time after detection starts and the number of times of turn motions of the user. The dead-reckoning device 230 estimates the position and azimuth detection error of the user utilizing correlation with the statistical data and outputs it to the photographing instructing unit 10.

The photographing instructing unit 10 determines whether the position and azimuth detection error becomes larger than a predetermined threshold. Furthermore, the photographing instructing unit 10 determines whether the user is located at the placement location of the mark 400 from the output signal of the sensor 210. In other words, the photographing instructing unit 10 instructs the photographing apparatus 220 to perform photographing according to the determination that the photographing of the mark 400 is necessary because the position and azimuth detection error becomes large, in addition to the determination that the mark 400 can be photographed.

Figure 15:
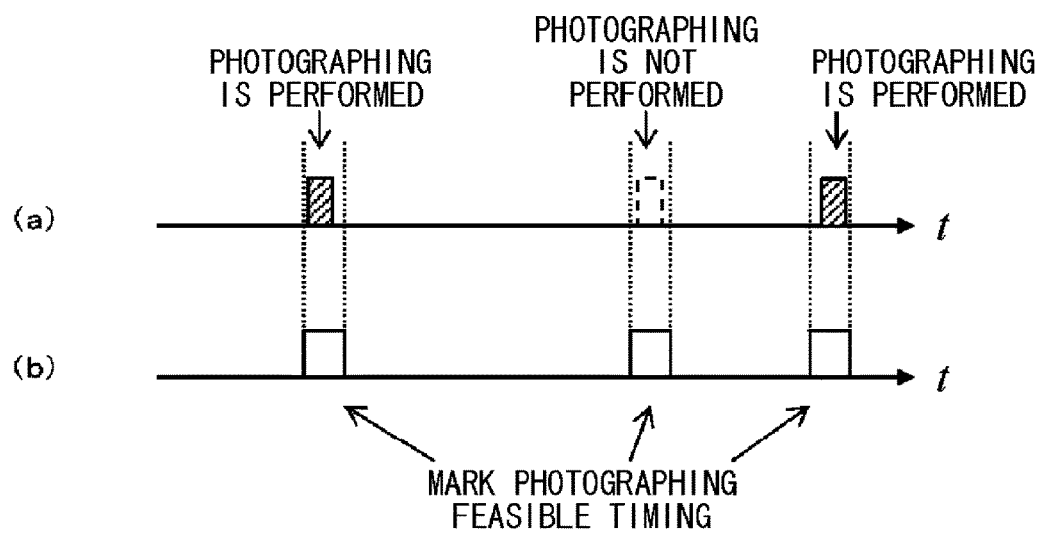
FIG. 15 shows an example of an operation of the position and azimuth detecting system 250.

FIG. 15 shows an example of an operation of the position and azimuth detecting system 250. The portion (a) of FIG. 15 shows the photographing execution timing and the portion (b) of FIG. 15 shows the mark photographing feasible timing.

The position and azimuth detecting system 250 performs photographing only when it is determined that the user is located at the placement location of the mark 400 based on the output signal from the sensor 210 and it is determined that the position and azimuth detection error of the dead-reckoning device 230 is large. In other words, even at the mark photographing feasible timing, the photographing apparatus 220 does not operate when the position and azimuth detection error is small. Therefore, the position and azimuth detecting system 250 can further reduce power consumption while maintaining the detection accuracy of the position and the azimuth at high accuracy.

As described above, the position and azimuth detecting device 100 according to implementation 1 executes photographing after determining whether the user is located at the placement location of the mark 400 based on the output signal of the sensor 210. Therefore, the position and azimuth detecting device 100 can reduce power consumption of the photographing apparatus 220 because the photographing apparatus 220 is made to operate only when the user is located at the placement location of the mark 400. Furthermore, the position and azimuth detecting device 100 according to implementation 2 executes photographing after determining whether the position and azimuth detection error is large in addition to whether the user is located at the placement location of the mark 400. Thus, the position and azimuth detecting device 100 of the present example can further reduce power consumption of the photographing apparatus 220 because the photographing apparatus 220 is made to operate only when the user is located at the placement location of the mark 400 and the position and azimuth detection error is large.

Figure 16:
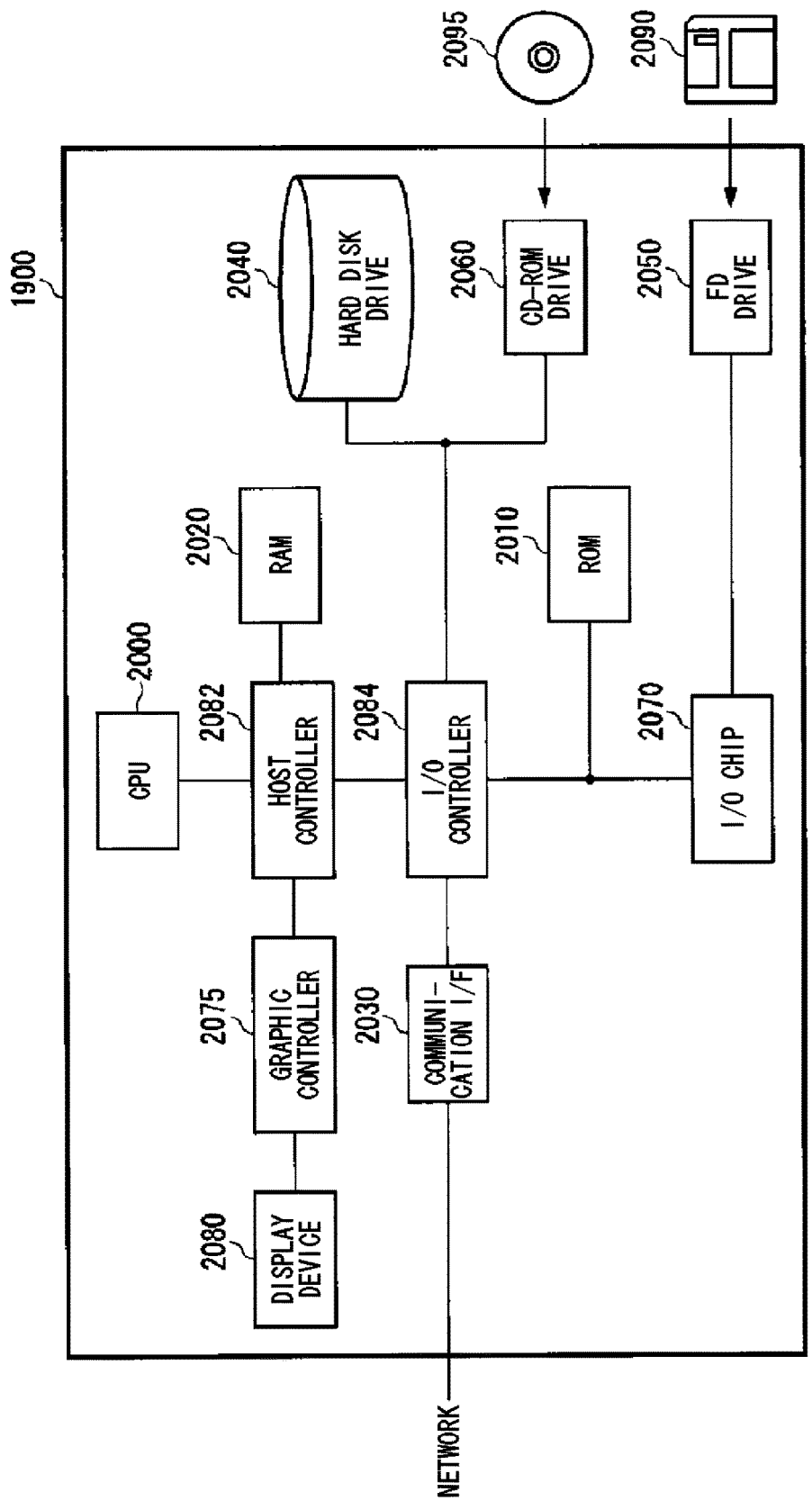
FIG. 16 shows an example of a hardware configuration of a computer 1900 according to an embodiment of the present invention.

FIG. 16 shows an example of a hardware configuration of a computer 1900 according to the present embodiment of the present invention. The computer 1900 of the present embodiment includes a CPU peripheral unit having a CPU 2000, a RAM 2020, a graphic controller 2075 and a display device 2080 interconnected by means of a host controller 2082, an input/output unit having a communication interface 2030, a hard disk drive 2040 and a CD-ROM drive 2060 connected to the host controller 2082 by means of an input/output controller 2084, and a legacy input/output unit having a ROM 2010, a flexible disk drive 2050 and an input/output chip 2070 connected to the input/output controller 2084.

The host controller 2082 connects the RAM 2020 to the CPU 2000 which accesses to the RAM 2020 with a high transfer rate and the graphic controller 2075. The CPU 2000 operates based on programs stored in the ROM 2010 and the RAM 2020 and controls each unit. The graphic controller 2075 acquires image data the CPU 2000 or the like generates on a frame buffer provided within the RAM 2020, and displays the image data on the display device 2080. Alternatively, the graphic controller 2075 may include therein the frame buffer to store the image data generated by the CPU 2000 or the like.

The input/output controller 2084 connects the host controller 2082 to the communication interface 2030, hard disk drive 2040 and CD-ROM drive 2060 that are relatively high-speed input/output devices. The communication interface 2030 communicates with other devices via a network. The hard disk drive 2040 stores programs and data the CPU 2000 within the computer 1900 uses. The CD-ROM drive 2060 reads programs or data from the CD-ROM 2095 and provides them to the hard disk drive 2040 via the RAM 2020.

Furthermore, the ROM 2010, the flexible disk drive 2050 and the input/output chip 2070 that are relatively low-speed input/output devices are connected to the input/output controller 2084. The ROM 2010 stores a boot program the computer 1900 executes at the time of start-up, a program which depends on hardware of the computer 1900, and/or the like. The flexible disk drive 2050 reads programs or data from the flexible disk 2090 and provides them to the hard disk drive 2040 via the RAM 2020. The input/output chip 2070 connects the flexible disk drive 2050 to the input/output controller 2084, and also connects various types of input/output devices to the input/output controller 2084 via, for example, a parallel port, a serial port, a keyboard port, a mouse port or the like.

The programs provided to the hard disk drive 2040 via the RAM 2020 are stored in a recording medium such as the flexible disk 2090, the CD-ROM 2095 or an IC card and are provided by the user. The programs are read out from the recording medium, installed in the hard disk drive 2040 within the computer 1900 via the RAM 2020 and executed on the CPU 2000.

The programs which are installed in the computer 1900 and make the computer 1900 function as the position and azimuth detecting device 100 includes a photographing instructing module, a mark reading module, a relative position and azimuth calculating module and a position and azimuth calculating module. These programs or modules encourage the CPU 2000 or the like to make the computer 1900 function as the position and azimuth detecting device respectively.

Information processing described in these programs functions as the photographing instructing unit 10, the mark reading unit 20, the relative position and azimuth calculating unit 30 and the position and azimuth calculating unit 40 that are specific means in which software and the various types of hardware resources described above cooperate as a result of reading the programs into the computer 1900. Then, with these specific means, the unique position and azimuth detecting device 100 appropriate for an intended use is structured by realizing operation or processing of information appropriate for the intended use of the computer 1900 in the present embodiment.

As an example, when communication is performed between the computer 1900 and an external device or the like, the CPU 2000 executes a communication program loaded on the RAM 2020, and based on the processing content described in the communication program, instructs the communication interface 2030 to perform a communication processing. Under the control of the CPU 2000, the communication interface 2030 reads out send data stored in a send buffer region or the like provided on a storage device such as the RAM 2020, the hard disk drive 2040, the flexible disk 2090 or the CD-ROM 2095 and sends it to a network, or writes receive data received from the network into a receive buffer region or the like provided on the storage device In this way, the communication interface 2030 may transfer send/receive data between the communication interface 2030 and the storage device through the DMA (direct memory access) method, and alternatively the send/receive data may be transferred in a manner that the CPU 2000 reads out data from a storage device or the communication interface 2030 of a transfer source and writes the data into the communication interface 2030 or a storage device of a transfer destination.

Furthermore, the CPU 2000 causes all or a necessary portion to be read into the RAM 2020 from among a file, a database or the like stored in an external storage device such as the hard disk drive 2040, the CD-ROM drive 2060 (CD-ROM 2095), the flexible disk drive 2050 (flexible disk 2090) through the DMA transfer or the like, and executes various types of processing on the data on the RAM 2020. Then, the CPU 2000 writes the data on which processing has been performed back to the external storage device through the DMA transfer or the like. Because in such a processing, the RAM 2020 can be considered that it holds the content of the external storage device temporarily, the RAM 2020 and the external storage device or the like are collectively called a memory, a storage unit, a storage device or the like in the present embodiment. Various types of information such as various types of programs, data, tables, databases or the like in the present embodiment are stored on such a storage device to be subject to information processing. Note that the CPU 2000 can hold a portion of the RAM 2020 in a cache memory, and read from and write to the cache memory. Because the cache memory has a part of functions of the RAM 2020 also in such a configuration, the cache memory is also included in the RAM 2020, the memory and/or the storage device unless indicated to be separated in the present embodiment.

Furthermore, the CPU 2000 performs on the data read out from the RAM 2020, various types of processing including various types of operation, information processing, condition determination, information search/replacement or the like described in the present embodiment that are designated by an instruction sequence of the program, and writes the result back to the RAM 2020. For example, the CPU 2000 determines whether various types of variables shown in the present embodiment meet a condition such as being larger than, smaller than, larger than or equal to, smaller than or equal to, or equal to other variables or constants when performing the condition determination, and if the condition is met (or if the condition is not met), branches into a different instruction sequence or invokes a subroutine.

In addition, the CPU 2000 can search for information stored in a file, a database or the like in the storage device. For example, when multiple entries in each of which an attribute value of a second attribute is associated with an attribute value of a first attribute are stored in the storage device, the CPU 2000 can search for an entry whose attribute value of the first attribute matches a designated condition from among the multiple entries stored in the storage device, and can obtain the attribute value of the second attribute associated with the first attribute which meets a predetermined condition by reading out the attribute value of the second attribute store in the entry.

The programs or modules described above may be stored in an external recording medium. As a recording medium, an optical recording medium such as a DVD or CD, a magneto-optical recording medium such as a MO, a tape medium, a semiconductor memory such as an IC card or the like can be used besides the flexible disk 2090 and the CD-ROM 2095. Furthermore, a hard disk provided in a server system connected to a dedicated communicate network or the internet, or a storage device such as RAM may be used as the recording medium to provide the computer 1900 with programs via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: photographing instructing unit, 20: mark reading unit, 30: relative position and azimuth calculating unit, 40: position and azimuth calculating unit, 50: mark judging unit, 100: position and azimuth detecting device, 200: position and azimuth detecting system, 210: sensor, 220: photographing apparatus, 230: dead-reckoning device, 250: position and azimuth detecting system, 300: shopping cart, 400: mark, 500: position and azimuth detecting device, 510: photographing apparatus, 520: mark reading unit, 530: relative position and azimuth calculating unit, 540: position and azimuth calculating unit

What is claimed is:

1. A position and azimuth detecting device including:
    a photographing instructing unit that acquires an output signal of a sensor mounted on equipment and instructs a photographing apparatus mounted on the equipment to perform photographing based on the output signal;
    a mark reading unit that reads from a mark included in an image photographed based on the instruction from the photographing instructing unit, position information and azimuth information included in the mark;
    a relative position and azimuth calculating unit that calculates a relative position and a relative azimuth of the equipment to the mark based on a geometric shape of the mark included in the image; and
    a position and azimuth calculating unit that calculates an absolute position and an absolute azimuth of the equipment based on the position information, the azimuth information, the relative position and the relative azimuth,
    wherein the photographing instructing unit
    instructs the photographing apparatus to perform photographing when the output signal of the sensor has a shape associated with a position of the mark, wherein the output signal of the sensor is a signal associated with the position of the mark based on motion information of a user of the equipment.

2. The position and azimuth detecting device according to claim 1, wherein the output signal of the sensor is a signal associated with the position of the mark independently of motion information of a user of the equipment.

3. The position and azimuth detecting device according to claim 2,
    wherein the photographing instructing unit
    instructs the photographing apparatus to perform photographing when a value of the output signal of the sensor is larger than a predetermined threshold, or when a value of the output signal of the sensor is smaller than a predetermined threshold.

4. The position and azimuth detecting device according to claim 2,
wherein the photographing instructing unit
instructs the photographing apparatus to perform photographing when a value of the output signal of the sensor is larger than a predetermined threshold, or when a value of the output signal of the sensor is smaller than a predetermined threshold.

5. The position and azimuth detecting device according to claim 2
wherein the photographing instructing unit
instructs the photographing apparatus to perform photographing when a time variation pattern of the output signal of the sensor is a predetermined pattern.

6. The position and azimuth detecting device according to claim 2,
wherein the photographing instructing unit
instructs the photographing apparatus to perform photographing when a time variation pattern of the output signal of the sensor is a predetermined pattern.

7. The position and azimuth detecting device according to claim 3,
wherein the photographing instructing unit
acquires an output signal of an angular velocity sensor mounted on the equipment, and when an absolute value of a vertical component of the output signal is larger than a predetermined threshold, instructs the photographing apparatus to perform photographing.

8. The position and azimuth detecting device according to claim 3,
wherein the photographing instructing unit
acquires an output signal of an angular velocity sensor mounted on the equipment, integrates a value of a vertical component of the output signal over a predetermined time, and when the integral value is larger than a predetermined threshold, instructs the photographing apparatus to perform photographing.

9. The position and azimuth detecting device according to claim 3,
wherein the photographing instructing unit
acquires an output signal of a magnetic sensor mounted on the equipment, calculates a difference value of the output signal at a predetermined time, and when an absolute value of the difference value is larger than a predetermined threshold, instructs the photographing apparatus to perform photographing.

10. The position and azimuth detecting device according to claim 4,
wherein the photographing instructing unit
acquires an output signal of an illumination sensor mounted on the equipment, and when a value of the output signal is larger than or smaller than a predetermined threshold, instructs the photographing apparatus to perform photographing.

11. The position and azimuth detecting device according to claim 6,
wherein the photographing instructing unit
acquires an output signal of an illumination sensor mounted on the equipment, converts the output signal into a digital signal, and when a time variation pattern of the digital signal is a predetermined pattern, instructs the photographing apparatus to perform photographing.

12. The position and azimuth detecting device according to claim 1,
wherein the photographing instructing unit
acquires a position and azimuth detection error of a dead-reckoning device mounted on the equipment and detecting a position and an azimuth based on an output signal of the sensor, and when the position and azimuth detection error is larger than a predetermined threshold, instructs the photographing apparatus to perform photographing.

13. The position and azimuth detecting device according to claim 12,
wherein the position and azimuth detection error of the dead-reckoning device is
deviation from a true position and a true azimuth estimated from elapsed time after position and azimuth detection starts and a number of times of turn motions of a user based on statistical data.

14. The position and azimuth detecting device according to claim 1 further comprising a mark judging unit that acquires the image, and judges whether the mark is included in the image,
wherein the mark judging unit
outputs the image to the mark reading unit and the relative position and azimuth calculating unit when the mark is included in the image.

15. The position and azimuth detecting device according to claim 14,
wherein the mark judging unit
discards the image when the mark is not included in the image.

16. A non-transitory computer readable recording medium on which is recorded instructions, the instructions executable by a processor to cause the processor to perform operations comprising:
acquiring an output signal of a sensor mounted on equipment;
instructing a photographing apparatus mounted on the equipment to perform photographing based on the output signal;
reading, from a mark included in an image photographed based on the instruction to the photographing apparatus, position information and azimuth information included in the mark;
calculating a relative position and a relative azimuth of the equipment to the mark based on a geometric shape of the mark included in the image; and
calculating an absolute position and an absolute azimuth of the equipment based on the position information, the azimuth information, the relative position and the relative azimuth,
wherein the instructing the photographing apparatus includes instructing the photographing apparatus to perform photographing when the output signal of the sensor has a shape associated with a position of the mark, and
wherein the output signal of the sensor is a signal associated with the position of the mark based on motion information of a user of the equipment.

* * * * *